(12) United States Patent
Vicari et al.

(10) Patent No.: US 7,337,749 B2
(45) Date of Patent: Mar. 4, 2008

(54) WASHABLE ABSORBENT ARTICLE AND USES THEREFOR

(76) Inventors: Christoper Vicari, R.R.2 Box 2040, Stroudsburg, PA (US) 18360; Emanuel Comitini, R.R.2 Box 2040, Stroudsburg, PA (US) 18360

( * ) Notice: Subject to any disclaimer, the term of this patent is extended or adjusted under 35 U.S.C. 154(b) by 51 days.

(21) Appl. No.: 10/964,136

(22) Filed: Oct. 13, 2004

(65) Prior Publication Data

US 2006/0102093 A1    May 18, 2006

(51) Int. Cl.
*A01K 13/00* (2006.01)
(52) U.S. Cl. ...................................... 119/601
(58) Field of Classification Search ........ 119/601, 119/650, 169, 526, 28.5
See application file for complete search history.

(56) References Cited

U.S. PATENT DOCUMENTS

| 5,309,866 | A | * | 5/1994 | Santoro | 119/650 |
| 5,653,195 | A | * | 8/1997 | Young | 119/526 |
| 5,797,347 | A | * | 8/1998 | Ochi | 119/169 |
| 6,244,216 | B1 | * | 6/2001 | Ochi | 119/169 |
| 6,805,076 | B2 | * | 10/2004 | Duffy et al. | 119/650 |

OTHER PUBLICATIONS

PiddlePaws; http://www.catpaper.com/piddlepaws/home.htm; Mar. 26, 2004.*

* cited by examiner

*Primary Examiner*—Thomas Price

(57) ABSTRACT

A liquid absorbent pad particularly useful for pet maintenance activities.

18 Claims, No Drawings

WASHABLE ABSORBENT ARTICLE AND USES THEREFOR

FIELD OF THE INVENTION

The invention relates to reusable liquid absorbent pads. The reusable absorbent pads of the invention are particularly well suited for use in pet homes, kennels and in grooming and exercise areas.

BACKGROUND OF THE INVENTION

Dog shows, such that sponsored by the Westminster Kennel Club, are extremely popular U.S. sporting events. Winning top honors are sought after and are celebrated accomplishments for dog owners, breeders and handlers alike.

In order to contend for the best of show, dogs must be true to breed, not only in terms of heritage but also in terms of grooming. This is particularly true for long haired animals that must be meticulously cut and/or combed, and for breeds having light colored coats that are prone to staining.

When dogs are not being judged in the ring, they are "benched," and required to stay in an assigned area all day. Dogs that must be left alone in a closed environment for an extended period of time, or groomed and staged prior to exhibition, need to be maintained on an environmental surface that is not only absorptive but will minimize damage to the dog's coat in terms of staining and/or pulling and/or tearing, or the like. The current invention addresses this need.

SUMMARY OF THE INVENTION

The invention provides an absorptive pad that can, if desired, be repeatedly laundered and reused. The pad comprises three layers, a fluid permeable top layer, an absorbent middle layer, and a liquid impermeable bottom layer, which layers are bonded together. In a preferred embodiment, the top layer is a brushed tricot fabric, the middle layer is a needlepunch polyblend and the bottom layer is polyurethane.

The invention also provides a method of maintaining an animal comprising keeping the animal on the pad of the invention. In one embodiment the animal is a dog that is being groomed. In a second embodiment, the animal is a dog that is being exercised. In a third embodiment of the invention, the animal is a dog that is being housed in a confined area such as a crate, a whelping box, a bathroom, a laundry room or the like. The pad of the invention is particularly well suited for maintaining long hair dogs such as a Maltese.

DETAILED DESCRIPTION OF THE INVENTION

As used herein the term "absorbent article" refers to devices that absorb and contain fluids, including but not limited to body fluids.

"Bonded" refers to the joining, adhering, connecting, attaching, or the like, of two elements. Two elements will be considered to be bonded together when they are bonded directly to one another or indirectly to one another, such as when each is directly bonded to an intermediate element.

"Disposable" refers to articles that are designed to be discarded after a limited use rather than being laundered or otherwise restored for reuse.

"Fabric" is used to refer to all of the woven, knitted and nonwoven fibrous webs.

"Liquid-impermeable" when used to describe a layer or laminate means that liquid such as urine will not pass through the layer or laminate under ordinary use conditions in a direction generally perpendicular to the plane of the layer or laminate at the point of liquid contact.

"Liquid permeable" refers to a layer or laminate that is not liquid impermeable.

"Nonwoven and nonwoven web" refer to materials and webs of material which are formed without the aid of a textile weaving or knitting process. A "nonwoven fabric or web" means a web having a structure of individual fibers or threads which are interlaid, but not in an identifiable manner as in a knitted fabric. Nonwoven fabrics or webs can be formed from many processes such as for example, meltblowing processes, spunbonding processes, and bonded carded web processes.

Product "thickness" refers to the caliper of the thickest portion of the open laid flat product.

The terms "top," "topsheet," and "upper" layer are used interchangeably to refer to the liquid permeable layer.

The terms "middle," "core" and "intermediate" layer are used interchangeable to refer to the liquid absorbent layer. This layer may also alternatively be referred to as the "soaker."

The term "bottom," "back" or "lower" layer are used interchangeably to refer to the liquid impermeable layer.

Use of the expressions "upper (top) layer" and "lower (bottom or back) layer" refer to the layers surrounding the absorbent core and denote the relationship of these materials or layers with respect to the absorbent composite core when in use.

The invention provides an absorptive construct, also referred to herein as a pad or a laminate, that can, if desired, be repeatedly laundered and reused. Alternatively, the pad may conveniently be disposed of following its initial use.

The pad of the invention comprises a liquid absorbent core sandwiched between upper and lower layers and having excellent liquid absorbency and retention. There is adequate absorbency of liquid by the absorbent core at the point of initial liquid contact such that immediately upon insult the liquid is rapidly distributed away from the point of insult to other parts of the absorbent core.

Use of the components of the invention enables the production of thin absorbent pads that may be washed and reused.

The pad is particularly useful in canine maintenance and hygiene. While the pad may use in kennel cabs, other animal crates, dog runs, and other types of confined spaces such as particular rooms e.g. bathroom, laundry space or the like) to absorb urine resulting from housebreaking accidents, prolonged confinement or incontinence, the pad may advantageously be used as a place mat whereon water bowls or the like are deposited. In this regard, it will be appreciated that when an animal is drinking, water will often splash from the bowl onto the floor/floor covering, or drip from the dog's mouth and/or collar/tags as the dog walks away from the bowl following drinking there from. The pad quickly absorbs water that spills thereon, protecting the floor from potential damage cause by water.

The top layer is a quick absorbing, non-staining material. Once the surface is made wet, the liquid is contained in one area and quickly disappears as it is pulled down into the middle layer therefore keeping the dog dry. The dog can relieve itself and still stand, walk, sit and/or sleep on the surface without getting wet or having the ends of its hair stained due to contact with urine.

In addition to absorbing urine, water, and other such liquids, it has been discovered that the pads of the invention, due to the upper and lower layers thereof, are particularly well suited for exercising and grooming animals, including but not limited to dogs.

The bottom layer of the pad functions to adhere the pad firmly to the floor surface. Therefore, the pad will not bunch-up, slide or slip when the animal lays, rolls, scratches, walks or runs thereon. The construct (pad) of the invention will withstand substantial movement upon application of a downward and/or lateral force. Thus the animal can exercise without tripping or slipping. They can be used on virtually any surface such as tile, wood, linoleum, cement, carpet and the like without slipping.

Moreover, the upper surface will not grab the hair. In this regard, and as will be appreciated by one skilled in the art, certain dogs, such as the Maltese, when shown in competition, are groomed such their hair sweeps across the floor when walking. Exercising animals or allowing animals to stand, sit or otherwise rest upon surfaces such as cement, concrete, as well as carpeted runs, which surfaces grab the hair tearing the ends, may result in a previously groomed dog that does not look as well manicured as it should. The top layer used in the manufacture of the absorbent pad of the invention will not pull, tear, rip or otherwise damage the ends of the hair. Thus making it an excellent surface for grooming dogs, and for exercising prior to entry into a show area/arena.

The absorbent pad comprises three layers, a fluid permeable top layer, an absorbent middle layer, and a liquid impermeable bottom layer, which layers are bonded together. In a preferred embodiment, the top layer is a brushed tricot fabric, the middle layer is a needle punch poly blend and the bottom layer is polyurethane. The pad constructed in accordance with the invention will have a product thickness of about 1-4 mm, most preferable about 2 mm.

Topsheet materials used in the practice of the invention are liquid-permeable materials. This upper layer is the liquid receiving face of the pad and is a fluid pervious, wicking layer. The liquid-pervious top sheet can be comprises of any suitable liquid-pervious material that permits passage of liquid there through. Included are non-woven spunbond or carded webs of polypropylene, polyethylene, nylon, polyester and blends of these materials, as well as woven and knitted fabrics. Particularly preferred however for use as the top sheet is a knitted or tricot polyester fabric, which does not fray, in particular brushed tricot fabric having a thickness in the range of 0.02 to 0.04 mm. It will be appreciated that any fabric may be used as long as it is pervious to liquid and does not grab hair.

An image may, if desired, be printed onto the fabric outer layer by transfer printing or the like, allowing the pad to carry an artful design, trademark, advertisement or other desired logo.

The absorbent intermediate layer used in the practice of the invention will typically comprise a nonwoven fabric or web. As defined hereinabove, a nonwoven fabric is defined as an interlocking fiber network characterized by flexibility, porosity and integrity. The individual fibers used to compose the nonwoven fabric may be synthetic, naturally occurring, or a combination of the two. The individual fibers may be mechanically, chemically, or thermally bonded to each other. Preferable a blend of synthetic thermally bondable synthetic polymer fibers such as polyolefins, polyamides, polyesters (e.g., polypropylene, polyethylene, polyethylene terephthalate), polyethers, and combinations thereof. Particularly preferred is a needlepunched polyethylene/polypropylene.

Backsheet materials used in the preparation of the absorbent products of the invention are liquid-impermeable materials which function to contain liquids, such as water and urine, within the absorbent core of the absorbent product and to protect bedding and/or floor coverings, e.g., carpeting or the like, from soiling. Examples are liquid-impervious materials such as polyolefin films, e.g., polypropylene and polyethylene. The back sheet is made from any suitable pliable liquid-impervious material known in the art. Typical back sheet materials include films of polyethylene, polypropylene, polyester, nylon, and polyvinyl chloride and blends of these materials. Preferred is a back sheet made of a polyurethane film having a thickness in the range of 0.02 to 0.04 mm. Particularly preferred for use as the backing layer is an aromatic polyether polyurethane film or sheet of the type commercially available from FABRITE® Laminating Corporation under the tradename Fabuthane®. The backsheet has sufficient liquid imperviousness to prevent leakage of fluids for the period of use, usually 2 to 3 insults per square yard of product. The plastic urethane bottom layer is a barrier that protects the surface underneath (wood floor, carpeting, etc.) from getting wet or stained. It securely adheres to almost any surface yet is fully removable without leaving any residue.

The selected components of the construct of the invention may be any desired color. For example, one embodiment comprises a laminate of a blue brushed tricot warp knit, a needlepunched polyethylene/polypropylene nonwoven material and a white Fabuthane®. The color of the selected components is not critical to the practice of the invention and will vary widely.

The absorbent pads of the invention are reusable, durable and economical. They may be machine washed and dried, being able to withstand multiple washing, and up to about 100 washes. The pads of the invention are hypoallergenic, environmentally friendly, they can be rinsed, rung out to dry and reused in minutes, without shrinking. They will not retain any odor and will not stain. Because the layers are bonded, the ends will not fray when cut.

It is contemplated that the pads will be available in a variety of sizes to suit the size of the animal (small, medium or large breed) and/or the type of end use contemplated (grooming area, exercise are, crate size). Examples include but are not limited to 24"×24", 36"×36", 20"×27", 24"×36", and various sizes of bolts/rolls, e.g., 3', 4' or 5' bolt containing up to about 100 yards of product. The product may be cut with conventional scissors, razor or like cutting instrument, to any desired size. The product may also be manufactured with a markings or lines on the exposed outer surface of the top or more preferably the exposed under surface of the bottom layer to facilitate cutting a desired length from the bolt of product.

It will be appreciated that the pads of the invention can be used for a variety of things. While the pads may be laundered, they are a disposable absorbent article. If using for travel and/or in hotel rooms, a soiled pad may conveniently be disposed of following use.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A method of maintaining an animal comprising, in order, the following steps:
   cutting from a roll of reuseable washable construct a desired size of said construct to provide said construct,
   placing and keeping an animal on said construct,
   washing the construct to provide a washed construct, and
   placing and keeping an animal on said washed construct,
   wherein the construct comprises a liquid permeable topsheet, a liquid-impermeable backsheet and an absorbent core located between said topsheet and said backsheet, and wherein the construct lacks substantial movement due to activities of the animal being kept on said construct.

2. The method of claim 1 wherein the animal is a dog.

3. The method of claim 2 wherein the dog being maintained is being housed in a confined area.

4. The method of claim 2 wherein the dog being maintained is being groomed.

5. The method of claim 2 wherein the dog being maintained is being exercised.

6. The method of claim 2 wherein the dog is a Maltese.

7. The method of claim 1 wherein said topsheet of the construct is a polyester fabric, said backsheet of the construct is polyurethane film, and said absorbent core of the construct is a nonwoven polyester blend.

8. The method of claim 1 wherein the construct comprises a brushed polyester knit topsheet, a needle punched polyethylene/polypropylene nonwoven core and a polyurethane backsheet.

9. The method of claim 1 wherein the absorbent core of said construct is a nonwoven material.

10. The method of claim 1 wherein said construct has a thickness of from about 1 mm to about 5 mm.

11. The method of claim 10 wherein said construct has a thickness of about 2 mm.

12. The method of claim 10 wherein said construct is square in shape.

13. The method of claim 10 wherein said construct is rectangular in shape.

14. The method of claim 1 wherein said roll is from about 3 feet wide to about 6 feet wide and greater than about 25 feet long.

15. The method of claim 14 wherein said roll is greater than about 50 feet in length.

16. The method of claim 1 wherein said construct has a design imprinted on the top and/or bottom surface thereof.

17. The method of claim 16 wherein said construct comprises a brushed polyester fabric topsheet, a needle punched polyethylene/polypropylene nonwoven core and a polyurethane back sheet.

18. A method of maintaining an animal comprising, in order, the following steps:
   (a) cutting from a roll of material, said material comprising a liquid permeable topsheet, a liquid impermeable backsheet and an absorbent core located between said topsheet and said backsheet, a desired size of material to provide a reusable washable liquid absorbent pad which comprises a liquid permeable topsheet, a liquid impermeable backsheet and an absorbent core located between said topsheet and said backsheet,
   (b) placing and keeping an animal on said absorbent pad,
   (c) washing the pad on which the animal was placed and kept to provide a washed reuseable and washable pad, and
   (d) placing and keeping an animal on said provided washed pad;
   wherein the provided pad lacks substantial movement due to activities of the animal placed and kept on said pad.

* * * * *